United States Patent [19]

Mattsson et al.

[11] 4,089,994

[45] May 16, 1978

[54] METHOD OF REPAIRING LACQUER DAMAGE

[75] Inventors: Hjalmar Egon Mattsson; Lars Magnus Severinsson; Bengt Erik Carsten, all of Malmo, Sweden

[73] Assignee: Auto-Make Up, Sweden

[21] Appl. No.: 703,643

[22] Filed: Jul. 8, 1976

Related U.S. Application Data

[62] Division of Ser. No. 579,418, May 21, 1975.

[30] Foreign Application Priority Data

May 24, 1974 Sweden .............................. 7406918

[51] Int. Cl.² .............................................. B32B 35/00
[52] U.S. Cl. .................................... 427/140; 106/178; 260/17 R; 156/94
[58] Field of Search ...................... 427/140, 142, 284; 106/178; 260/17 A; 156/94; 428/63; 264/36

[56] References Cited

U.S. PATENT DOCUMENTS

| | | | |
|---|---|---|---|
| 2,069,501 | 2/1937 | Miller | 427/140 |
| 2,742,443 | 4/1956 | Diggles | 106/178 |
| 2,826,508 | 3/1958 | Giles | 427/140 |
| 3,883,453 | 5/1975 | Takahashi et al. | 260/17 A |
| 3,930,068 | 12/1975 | Sloan | 156/94 |

*Primary Examiner*—Ronald H. Smith
*Assistant Examiner*—Sadie L. Childs
*Attorney, Agent, or Firm*—Bucknam and Archer

[57] ABSTRACT

A method of spot repairing lacquered surfaces especially on motor cars and other vehicles, in which after a spot repair in any conventional manner the repaired surface and adjacent area of the original lacquer is coated with a border line obliterating liquid which consists of a clear lacquer composition of a mixture of from between 65 and 80 parts by weight of polymethyl methacrylate and 35 and 20 parts by weight of cellulose acetate butyrate, which composition is dissolved in an organic solvent or solvent mixture in such an amount that the border line obliterating liquid will have a viscosity suitable for spray application.

7 Claims, No Drawings

METHOD OF REPAIRING LACQUER DAMAGE

This is a division, of application Ser. No. 579,418, filed May 21, 1975.

The invention relates to a method of repairing lacquer damages on surfaces of any kind, and particularly lacquer damages on motor cars and other vehicles.

The invention has for its general object to improve the spot repairing technique, such that, for satisfactory results, repairs of lacquer damages need not necessarily be extended over a surface having natural borders, such as a complete mudguard or car door or any other surface defined by moldings, rims, edges, joints etc. By prior-art colour mixing technique, lacquers can be produced in the correct hues for the repair of lacquer damages on cars, but it is desirable to cover the applied coloured lacquer by spraying a clear lacquer to form a top layer as a protection of the coloured lacquer and to give the repaired area the same surface finish as the other lacquer coat. However, it is difficult in making repairs of this kind to provide a surface finish which does not reveal that a lacquer damage has been repaired. In other words it is very difficult to repair a lacquer damage so that the repair will be unnoticeable. The present invention, however, makes this possible by spraying a border line obliterating liquid over the newly applied lacquer and the immediately adjacent areas of the original lacquer coat, said obliterating liquid consisting of a mixture of from between 65 and 80 parts by weight of methyl methacrylate and 35-20 parts by weight of cellulose acetate butyrate, which composition is dissolved in an organic solvent or solvent mixture in such an amount that the border line obliterating liquid will have a viscosity suited for spray application.

When applied to a damaged lacquer surface which has been correctly primed (that is, primed and provided with a covering layer of coloured lacquer prepared according to some prior art colour mixing scheme), the border line obliterating liquid will obliterate visible borders (transitions) between the old and the new lacquer. After finish polishing, the border line obliterating liquid will give a lacquer surface which at visual inspection does not reveal the repaired area.

It has proved possible to use the border line obliterating liquid according to the present invention with satisfactory results for a very large percentage of the lacquers employed in the automobile industry. The border line obliterating liquid according to the invention can be used for the application of satisfactory surface layers in spot repairing lacquer damages on cars, caravans, pleasure boats etc, practically irrespective of the type of lacquer used for them, possibly apart from the insignificant number of motor cars etc. which are lacquered with certain special lacquers which are difficult to repair. The expression "lacquers difficult to repair" here means certain automobile lacquers which by reason of their specific composition or the specific technique of applying them give a particular optical effect which is difficult to reproduce in a thoroughly exact manner by any simple repairing technique. However, also in these relatively few cases the invention gives a considerably improved result as compared with the prior technique of repairing damaged lacquer surfaces.

As will appear from the following description and the appended claims, the invention also relates to a lacquer composition for carrying the method into effect. This lacquer composition consists of from between 65 and 80 parts by weight of methyl methacrylate and from 35 to 20 parts by weight of cellulose acetate butyrate. By the addition of suitable solvents to a viscosity suited for spray application said composition can be used as a border line obliterating liquid for spray application after a basic reparation of a lacquer damage in accordance with the prior technique, that is, priming (grinding etc.) and overspraying the primed surface one or more times for attaining a suitable hiding power with the use of a coloured lacquer produced according to some conventional or suitable colour mixing scheme.

The border line obliterating liquid according to the invention has a double purpose, namely, on the one hand, to provide a durable surface layer on the applied coloured lacquer, and on the other hand to obliterate any traces of a lacquer damage having been repaired, which means that it shall not be possible at a visual inspection to discover the lacquer surface repaired and, which is most critical, that no visible transitions between the old and the new lacquer can be observed. Therefore, the lacquer composition according to the invention can rightly be designated as a "border line obliterating liquid;" for greater simplicity this designation is utilized in the following for the product according to the present invention with solvents added thereto.

In the preferred composition the border line obliterating liquid according to the invention includes two lacquer main constituents of two different types and suitable solvents and diluents. One main constituent is a cellulose acetate butyrate product of the type which is not prepared by mechanical mixing of two esters but by butyrylization and acetylation of the cellulose chain so that butyryl and acetyl groups have been substituted for certain hydroxyl groups. The other main constituent is polymethyl methacrylate.

Experiments have been made with the use of different esters of acrylic and methacrylic acid and different cellulose esters, such as cellulose acetate and cellulose butyrate, in several different qualities available on the market. It has proved that most superior results have been achieved with the use of a mixture of polymethyl methacrylate and cellulose acetate butyrate which has a relatively large butyryl proportion, such as about 30 – 45%.

Cellulose acetate butyrates of the kind indicated are available on the market in several viscosity classes which give an approximate measure of the average chain length or molecular weight of the type of ester in question. The butyryl, acetyl and hydroxyl contents are important factors. Experiments have shown that with the use of clear lacquer compositions according to the invention which contain mixtures of cellulose acetate butyrate and methyl methacrylate, results are achieved which have a pronounced optimum between certain limits with regard to the butyryl/acetyl ratio and viscosity of the cellulose ester. Thus the best results have been obtained with the use of cellulose acetate butyrate which contains about 3 times as large a butyryl proportion as an acetyl proportion. This ratio of 3:1 would seen to give an optimum with the use of cellulose acetate butyrate together with polymethyl methacrylate according to the invention irrespective of the solvents and diluents used, although the total results are dependent also upon these substances, and it is stressed that the peak of the optimum results is not narrow, which means that good results are also achieved in the limit ranges of the ratio of 3:1. As regards viscosity the best results would seem to be obtained at viscosities up to a maximum of 200 poise or about 50 seconds according to ASTM, determination method D-1343-54T for a 20% solution of cellulose acetate butyrate in a mixture of a 90% acetone and a 10% ethylalcohol, and the optimum value would seem to lie within the range of 0.3 – 3.5 seconds.

A further important factor for a fully satisfactory result is the relative proportion of the amount of methyl methacrylate to the amount of cellulose acetate butyrate. The amount of methyl methacrylate should be about 2–4 times larger than the amount of cellulose acetate butyrate; the optimum result would seem to lie in the range of 3:1 for the relative weight ratio.

The best result hitherto gained with the use of the so-called border line obliterating liquid according to the invention has been reached with a cellulose acetate butyrate available on the market and filtered in the course of the manufacture, which cellulose acetate butyrate has a total content of butyryl ($C_4H_7O$) of about 37% at a total acetyl amount of about 13% and about 50% total cellulose residue with about 2% free hydroxyl. A viscosity class of half a second according to ASTM D-1343-54T should be chosen. Cellulose acetate butyrate of this composition and viscosity class is available on the market under the designation "semi-second butyrate." It has proved that this product is well compatible with methyl methacrylate and possesses better properties in these respects than cellulose acetate butyrate having an essentially lower and higher butyryl content. It would seem as if the good compatibility for use in accordance with the present invention prevails at a butyryl amount from between about 30 and 45% with an optimum in the range of about 35 – 40%.

As polymethyl methacrylate, that is a polymerizate on the basis of methyl methacrylic acid ester having a molecular weight of between about 50 000 and 500 000, use is preferably made of a product available on the market and having a molecular weight of between 100 000 and 200 000, a density of from between 1.1 and 1.25 g/cm$^3$ and preferably about 1.13 g/cm$^3$, a reduced viscosity (viscosity number) $\eta$ sp/C (CHCl$_3$, $\eta$ rel 1.1–1.2) of 50 – 60 cm$^3$/g and an actual viscosity (Brookfield) of the product dissolved in ethyl acetate of about 10 cP at a dry solids content of 10% and about 100 cP at a dry solids content of 20%. A film, free of solvent, of this polymethyl methacrylate is clear as glass, very hard and non-tacky. It may be mentioned that the polymethyl methacrylate as such is soluble in acetone, methyl ethylketone, cyclohexanone, ethylacetate, butylacetate, methyl glycol, methyl glycol acetate, tetrahydrofuran, toluene, trichloro ethylene, methylene chloride. The preferred solvents for the so-called border line obliterating liquid according to the present invention are more fully described in the following paragraph.

The proportion of methacrylate relative to the proportion of cellulose acetate butyrate may vary within certain limits with respect to the above preferred ratio of 3:1. At an increase and decrease relative to this value an initially slow deterioration of the effect of the border line obliterating liquid can be observed, but this deterioration becomes progressively more rapid at an increase or decrease from the preferred value. The ratio of methyl methacrylate to cellulose acetate butyrate should seemingly not lie outside the range of 65 – 80 to 35 – 20.

For the production of the border line obliterating liquid according to the invention, polymethyl methacrylate and cellulose acetate butyrate in finely pulverized form should be used as starting materials, and these substances should be dissolved in solvent compositions which completely dissolve the two substances and give a stable solution. The solvents must therefore be compatible with both the methyl methacrylate and the cellulose acetate butyrate utilized, and as for the last-mentioned substance the butyryl amount would seem to be of decisive importance to the choice of both solvents and diluents. A further very essential factor is that such solvents and diluents must be used, which do not only result in that the clear lacquer applied will have a good hiding power at the required area, but also realizes an effective bond and unnoticeable transition to the original lacquer surrounding the repaired area, and finally the solvents and diluents should escape without clouding or otherwise deteriorating the clear lacquer applied. It is therefore desirable to select a composition of solvents and diluents the components of which escape in a sequence that does not result in a cloudy crystallization.

Cellulose acetate butyrate and polymethyl methacrylate in dry powder form are soluble in many solvents, such as mixtures of alcohol and certain hydrocarbons. It has proved that the viscosity of the solution is essentially dependent upon the ester concentration of the cellulose acetate butyrates and that a mixture of polymethyl methacrylate and cellulose acetate butyrate certainly is not soluble in alcohol, but the presence of lower alcohols in certain solution systems highly reduces the viscosity of the solution. The use of toluene, xylene and ethylacetate among the solvent systems employed according to the invention will for instance give a steep decrease of the viscosity at additions of a lower alcohol (ethyl alcohol) up to 20%, and a steep increase at amounts over 40%. The optimum alcohol concentrations for obtaining the lowest viscosities, of course, are dependent upon the solvent combination.

Naturally, economical aspects play an important role for the production of a suitable border line obliterating liquid according to the invention. To minimize costs it is desirable to use as much diluent as possible without sacrificing film quality. In the lacquer composition according to the invention, cellulose acetate butyrate is more sensitive than methyl methacrylate and is greatly determinative for the aspects of the production of the border line obliterating liquid according to the invention. It has also proved that the butyryl content of the cellulose acetate butyrate is of great importance both to the tolerance for diluents, the compatibility with acrylates and to the flexibility and hardness. The solubility, the tolerance for diluents and the flexibility increase with increasing butyryl content, while the hardness decreases. At a butyryl content from about 17 to 20% about 15% toluene only is tolerated to yield clear coats, while cellulose acetate butyrate having a butyryl content of from about 38 to 40% in and per se tolerates more than 90% toluene. The compatibility with acrylates is very satisfactory at butyryl contents of from between about 30 and 45%.

A solution composition comprising for instance 80% toluene gives a viscosity approximately 50 cP lower than that attained with the use of active solvent only. Toluene and xylene appear to be the best diluents for use in connection with the invention. The effect of ethylalcohol in a solution has already been discussed. At an increase of the amount of diluents in a solution containing from about 20 to 40% alcohol, the viscosity first decreases and then increases depending upon the type of hydrocarbons utilized.

For a mixture of polymethyl methacrylate and cellulosic ester butyrate, a butyryl content of from between 30 and 45%, and preferably 35 to 40%, and an acetyl content of from 8 to 25%, and preferably 10 to 15%, are preferred. Excellent results have then been attained with the use of solvent mixtures containing a 95% ethylalcohol in an amount of between 10 and 20% toluene and/or xylene as diluent.

Ethylacetate, isobutylacetate, acetone and diacetone alcohol are suitable and certain ketones such as methyl ethyl ketone are examples of other suitable solvents that can be used together with, or as substitutes for, ethylalcohol.

For the preparation of a border line obliterating liquid according to the invention, which is suitable for spray application and which contains as basic constitutents polymethyl methacrylate and cellulose acetate butyrate according to the above description, it is suitable to use toluene and xylene to attain a viscosity suitable for spray application.

As examples of suitable solvents and diluents for the preparation of lacquer compositions according to the invention with the use of the above described "semi-second butyrate" and methyl methacrylate, mention may be made of a 95% ethylalcohol, ethylacetate and isobutylacetate or butyl ester up to about 30% for each substance and toluene up to about 50%, for instance 10-20% ethylalcohol, 10-20% ethylacetate, 10-20% isobutylacetate and 40-50% toluene. The toluene can be combined with xylene in which case the amount of toluene is reduced correspondingly, and instead of the above-mentioned acetates use can be made of ethyl glycol acetate.

It is preferable that the dry solids product consisting of pulverulent cellulose acetate butyrate and polymethyl methacrylate is first dissolved in a 95% ethylalcohol. For a composition of 1600 parts of polymethyl methacrylate and 600 parts of cellulose acetate butyrate (thus the proportions 8 to 3) use has been made as solvents with extraordinary good results of 600 parts of a 25% ethylalcohol, 600 parts of toluene, 300 parts of ethylacetate, 400 parts of xylene and 100 parts of butylester, about one fourth of the total $C_2H_5OH$ amount being used in the form of a 95% ethylalcohol for the solution of the dry powder mixture. The other three fourths of the $C_2H_5OH$ amount are used in the solvent mixture which is slowly added under agitation to the product dissolved in ethylalcohol. The liquid is then stirred in intervals of about 8 hours during about 2-3 days, whereupon the liquid is allowed to remain in a quiescent state for about 10 – 14 days before use. Prior to spraying the liquid is diluted with an about 80% acryl thinner.

The above amounts are parts by weight of the total amount but it should be observed that the amounts and also type of solvents may vary.

It should also be observed that the border line obliterating liquid according to the invention can be produced with a higher viscosity for storage and sale in order to be diluted, when used, to the viscosity suitable for spray application.

It is not fully known why the use of the border line obliterating liquid according to the invention gives a result far superior to those obtained with the use of the clear lacquers recommended by the manufacturers of automobile lacquers. However, it seems as if the composition according to the invention has two very essential properties. Firstly, it does not destroy the properties of the coloured lacquer applied as a touch-up lacquer to a surface which has been primed and the lacquer of which has been damaged, and secondly it appears to flow together and fuse with the old lacquer without changing the appearance thereof, the transitions between the new and old lacquers being entirely invisible to the naked eye, provided that the preliminary operations have been correctly performed, which offers no difficulty if the mixing directions are followed at the preparation of the coloured lacquer and the priming operations are performed in the requisite careful manner.

The method and the composition according to the invention have been thoroughly tested and give fully satisfactory results in spot repairing damaged lacquer areas on cars sprayed with any conventional types of lacquers and have also proved to give good results in spot repairing so-called multicomponent lacquers and metallic lacquers. The composition has also been tested by sprayers of average professional skill who did not possess any knowledge of the special nature of the composition but were instructed how to use the composition. It proved that the usefulness of the composition is not dependent upon great skill but that the composition can be used with complete success by sprayers of normal professional skill.

Moreover, it has proved possible in a very simple manner to efface such scratches in lacquered surfaces as have been made in clear top lacquer coats but have not penetrated to the subjacent coloured lacquer coat. For the repair of such very frequent scratches on for instance new motor cars use can be made of a border line obliterating liquid that is diluted in a minor degree, that is, has a relatively high viscosity, it being understood, however, that the liquid shall be sprayable. This will make it possible to efface the scratches without any visible borders between the top lacquer coat and the border line obliterating liquid applied.

Apart from the above-described components it is conceivable to use small amounts of additions, for instance acrylonitrile up to one or more percent for increasing the film flexibility, or substances promoting certain properties which may be desirable depending upon the particular lacquer to be repaired.

What we claim and desire to secure by Letters Patent is:

1. In the repairing of damaged areas of lacquer coats, spot repairing of lacquered surfaces and partial re-lacquering, the method of obliterating visible borders between the new coloured lacquer applied and the adjoining regions of the original lacquer coat, consisting of priming the damaged areas and spraying onto the newly applied lacquer and the immediately adjacent areas of the original lacquer coat a border line obliterating liquid which consists of a clear lacquer composition of a mixture of from between 65 and 80 parts by weight of polymethyl methacrylate and 35 to 20 parts by weight of cellulose acetate butyrate, the ratio of butyryl to acetyl being about 3:1, said composition being dissolved in an organic solvent or solvent mixture in such an amount that the border line obliterating liquid will have a viscosity suitable for spray application.

2. A method as claimed in claim 1, wherein said composition contains about 3 times as large a proportion of methyl methacrylate as the proportion of cellulose acetate butyrate.

3. A method as claimed in claim 1 wherein the cellulose acetate butyrate contains 30 – 40% butyryl and 8 – 25% acetyl.

4. A method as claimed in claim 3, wherein the cellulose acetate butyrate contains about 7% butyryl, about 13% acetyl and 2% free hydroxyl.

5. A method as claimed in claim 3 wherein the cellulose acetate butyrate has viscosity in a 20% 90/10 acetone/alcohol solution up to 50 seconds according to ASTM D-1343-54T.

6. A method as claimed in claim 1 wherein polymethyl methacrylate is in the form of a powder which is dry at room temperature and has a density from between about 1.1 and 1.25 and a reduced viscosity (viscosity number) $\eta$ sp/C (CHCl$_3$, $\eta$ rel 1.1–1.2) of about 50–60 cm$^3$/g, and wherein said cellulose acetate butyrate also is in the form of a dry powder before the solvent or solvent mixture is added thereto.

7. A method according to claim 1 wherein said mixture of cellulose acetate butyrate and polymethyl methacrylate is dissolved in a mixture of 95% ethylalcohol, ethylacetate and isobutyl or butyl acetate, in the amount of up to 30% of each and toluene in the amount of up to 50% or in a mixture xylene substituted therefor.

* * * * *